2,495,597

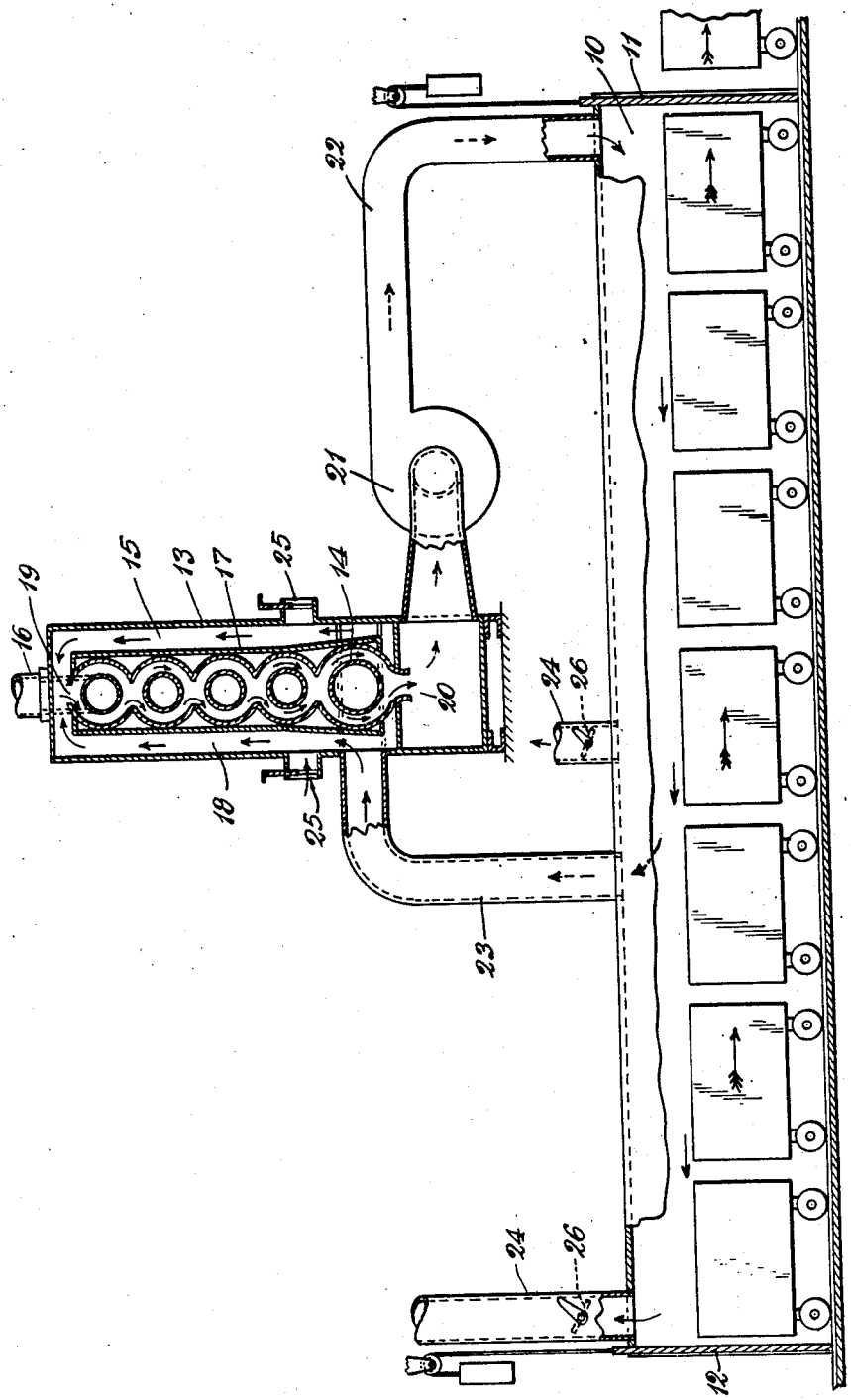
Jan. 24, 1950     H. NAPIER     2,495,597
BONDING MINERAL INSULATING MATERIAL
Filed Dec. 22, 1947
Inventor
Henry Napier Patented Jan. 24, 1950

UNITED STATES PATENT OFFICE 2,495,597

BONDING MINERAL INSULATING MATERIAL

Henry Napier, Springfield, Ill., assignor to F. E. Schundler & Co., Inc., Joliet, Ill., a corporation of Illinois Application December 22, 1947, Serial No. 793,095

6 Claims. (Cl. 18—47.5)

This invention relates to bonding mineral materials, and particularly to bonding refrectory insulating aggregates which employ lime in the bonding materials.

Bonding agents heretofore employed in high temperature insulating materials have substantially reduced the insulating efficiency of the product. Reduction in amount of bonding agents to raise the insulating efficiency (i. e. reduce the so-called K-factor) to the desired level has resulted in excessive weakness of the molded insulation. It is one of the objects of the present invention to provide a high temperature insulating material having adequate strength (e. g. a modulus of rupture of at least 50 pounds) and with a low K-factor, e. g. .4 at a mean temperature of 350° F. The problem of providing adequate strength for high temperature insulation arises therefore, only in connection with the need for a low K-factor.

The nature of the invention may be readily understood by reference to one illustrative embodiment thereof hereinafter described.

Many refractory aggregates are bonded together by a ceramic or vitreous bond developed on firing. Development of a bond by firing is, however, expensive and in some cases impracticable because of shrinkage and distortion caused by firing, and in the case of refractory insulation, because of substantial reduction of insulating efficiency. Those refractories which are not fired require binding materials capable of withstanding the temperatures to which the material is subjected. Refractory insulation (in high pressure boilers and steam lines for example) must now be capable of withstanding temperatures in excess of 1200° F.

One of the most satisfactory refractory bonding ingredients has been found to be hydrated lime which under proper conditions reacts with silica or alumina or both to form calcium silicates and/or aluminates, bonding substances which are very refractory. Satisfactorily rapid reaction between the lime and silica (and/or alumina) requires both moisture and heat; and heretofore it has been necessary to use an indurator (i. e. heat and substantial pressure in the presence of moisture) to produce a reaction between lime and silica and/or alumina. Generally the materials, including the lime, silica and alumina-containing substances, are prepared in wet or slurry form to facilitate molding. Upon dewatering and removal of the material from the mold and while it is still wet, heat is applied to develop the bond. Probably reaction occurs progressively between the silica (and/or alumina) and that portion of the lime which goes into solution. This, however, is merely a theory.

I have discovered that a satisfactory bond can be developed simultaneously with the drying of the material provided carbon dioxide, $CO_2$, and possibly also carbon monoxide, $CO$, be substantially excluded from the heating and drying atmosphere. In most efficient heating and drying apparatus, the hot atmosphere (being gases of combustion) contains a substantial amount of $CO_2$ and doubtless some $CO$. I have found that these gases substantially weaken the material, making it soft and friable. Possibly these gases and particularly $CO_2$ react with the lime to form carbonates and to that extent eliminate the lime (and therefore the silicates and aluminates) as bond forming agents. Also, the resulting carbonate is undesirable as an aggregate and may ctherwise impair the bond. Possibly after completion of the reaction between the lime and silica, $CO_2$ will not be harmful if the material be dry, but it is preferable to exclude the $CO_2$ throughout the drying operation.

One example of a material which may be advantageously treated by the present process is that disclosed in my co-pending application, Serial No. 490,634, now U. S. Patent No. 2,456,643. As disclosed in said application the illustrative material is characterized by submicroscopic particles of Portland cement which have been substantially completely hydrated in an aqueous slurry (preferably heated) until the particles of cement have substantially completely lost their power to bond to each other. During hydration the particles of Portland cement are held dispersed and out of substantial bonding contact by a voluminous dispersion such as bentonite. Because of the extremely small particle size of the dispersant it acts somewhat as a gel in maintaining the particles of cement separated so that they can hydrate substantially completely without bonding to each other. A still lighter material may be formed by periodically agitating the slurry to break up incipient bonding between particles which happen to come into contact.

In the uses to which Portland cement has heretofore been put, it does not exhibit the property utilized in the present invention, namely, that of forming a bulky light weight particle. It was designed for use as a bonding agent and for that purpose it must hydrate in compressed or confined condition in intimate contact with the particles of aggregate which it is to bond together. Initially, it is a dense material and on hydration forms a dense product. For greater bonding efficiency and strength a minimum amount of water is used to prevent the separation of the constituents by excess of water which would leave substantial areas out of bonding contact with each other when the free water disappeared. In the conventional use of Portland cement, hydration progresses over a long period of time. Such progressive hydration is evidenced not by increase in size of the hydrated particles, but by increase in strength over a long period of time. None of the conventional conditions under which Portland cement has heretofore been used is present in this invention.

While not theoretically perfect for present purposes, Portland cement has the advantage of cheapness, general availability and its end products are quite refractory.

Other illustrative substances for maintaining the Portland cement in dispersed or separated condition during development of the light weight particles are very short fiber asbestos and attapulgite.

According to a preferred method of making the material, separate slurries of the separating agent, e. g. bentonite, and Portland cement are prepared. Due to the presence of electrolytes in tap water, the bentonite particles flocculate on hydration; nevertheless they form a very voluminous dispersion which has very little tendency to settle. The bentonite and Portland cement slurries are then mixed together and agitated periodically. Agitation counteracts the initial tendency of the heavy cement particles to settle and prevents particles which may have come into contact through failure of the dispersant, from effectively or permanently uniting. To make the most efficient product, that is one having the lowest apparent density (lowest weight per unit volume) a plurality of alternate agitation and quiescent or rest periods are advantageously employed. The bentonite or other dispersant mainly functions to maintain the separation essential to efficient development of the light weight particles, and agitation prevents any uniting of the particles which would interfere with maximum development to the most efficient product. As the particles delevop whether between or in conjunction with the floccules of bentonite as a skeleton or nucleus, the need for agitation decreases since increase in surface area of the particles resists settling. Doubtless helpful conteraction of settling is produced by upward convection or other currents within the material.

Upon hydration of Portland cement a substantial amount of lime (calcium hydrate) is liberated, which if not utilized would serve to increase weight and to weaken the material by gradual development of carbonates when exposed to the action of $CO_2$. Such lime varies from 13 to 20% on the dry weight of the Portland cement. High early strength cements liberate more lime than ordinary Portland cements. This lime is advantageously used to develop calcium silicates and calcium aluminates by reaction with silica added to the material and with the silica and alumina in the bentonite. The essential constituent of bentonite is montmorillonite which has the general formula $(OH)_{12}Al_4Si_8O_{16} \cdot XH_2O$. It is characterized by an expanding lattice comprising sheets of oxygen, silicon (silica) and aluminum, oxygen (alumina) atoms loosely held together in the direction of one axis. In the common forms of Wyoming bentonite alumina $(Al_2O_3)$ comprises about 20% and silica about 60% of the dry weight of the bentonite. I have discovered that in the finally sub-divided condition of my material, reaction between the lime, silica and alumina takes place at atmospheric pressure. This reaction advantageously continues during the curing and drying period to form the bonding substances, as presently described. Additional silica in a form which is more efficient in combining with the lime (e. g. diatomaceous earth or fly ash) is preferably added to insure that all lime will be utilized. These forms of silica, and particularly diatomaceous earth, present large surfaces in relation to their mass for reaction with the lime. The silica from the bentonite is apparently not in quite as efficient a form for combining with the lime.

One illustrative product may be formed from the following solids in the proportions given:

|  | Parts by Weight | Percent |
| --- | --- | --- |
| Portland cement (including 13 to 20% liberated lime—about 18% for the average high early strength Portland cement—availablef or reaction with silica and alumina) | 359 | 71.8 |
| Bentonite (including 20% alumina and 60% silica) | 65 | 13 |
| Added silica—e. g. diatomaceous earth | 38 | 7.6 |
| Long fiber asbestos (amosite) | 38 | 7.6 |
|  | 500 | 100 |

From the Portland cement about 65 parts of lime (18%) will presently be available; and from the bentonite about 13 parts alumina and 39 parts silica. The latter with the diatomaceous earth provides about 77 parts silica. If the lime combine with all the alumina to form penta calcium aluminate, about 16 parts of lime will be required, leaving 59 parts of lime to combine with the silica to form one or more of the various forms of calcium silicate, i. e. tri-, di-, and mono-calcium silicate. If fine asbestos fiber or attapulgite be used in place of bentonite, appropriate adjustment in the added silica should be made in relation to the available alumina to insure complete utilization of all the liberated lime.

The following procedure may be advantageously used to make a 1,000 gallon batch of the material. The bentonite slurry comprises 65 pounds of bentonite to 123 gallons of clear water. This mixture is agitated by a high-speed mixer for about 30 minutes. At some stage after the initial mixing, the diatomaceous earth (38 pounds) is added. The slurry is then diluted by addition of 600 gallons of clear boiling water. The resultant slurry is restored to boiling condition with live steam during which process the liquid is augmented by about 133 gallons of condensed steam. It requires about ten minutes to restore boiling temperature.

The Portland cement slurry is preferably made by using the filtrate resulting from the de-watering of previous batches as presently described. 359 pounds of Portland cement are added to about 55 gallons of filtrate. The mixture is advantageously agitated with a high-speed mixer for about ten minutes. This assists hydration by thoroughly separating the cement and possibly also results in some further sub-division by attrition. Preferably high early strength Portland cement is used which, because of its fineness or otherwise, hydrates more rapidly. It should be understood that the resulting hydrated particles are much smaller than the smallest starting grain of Portland cement, since hydration takes place only as the cement goes progressively into solution.

The Portland cement slurry is added to the boiling bentonite slurry and the mixture agitated and restored to boiling temperature by reheating. Preferably agitation is continued for only about three minutes, leaving a short interval until boiling actually occurs, whereupon agitation is resumed for about one minute to prevent violent boiling which may ensue because of the additional heat released by the Portland cement.

Following inter-mixture of the cement and bentonite slurries, there ensues a series of reheating, agitation, and rest periods. In the present case about twenty-five minutes after inter-mixture, as aforesaid, the batch is reheated e. g. with live steam, and when ebullition is imminent, the mass is agitated mechanically. Agitation, of course, arrests boiling. During boiling, agitation need not be continuous. The duration of actual agitation is about one and one-quarter minutes. A total of about seven agitation and reheating periods of this character may advantageously be employed at increasing intervals. The first four intervals are about twenty-five minutes each and the remaining about thirty minutes each. As stated above, convection currents within the mass doubtless counteract settling even during so-called rest periods, which aid in promoting particle lightness.

The completed batch may then advantageously stand for a number of hours (preferably overnight) to secure a still lighter particle by complete hydration or reaction, at least so far as hydration or reaction contributes to the size or bulk of the particle. Further hydration or other alteration of the Portland cement, if any, which may subsequently take place is of a different character since is does not produce a bulkier or lighter particle.

For making molded or block material the mass is advantageously reinforced with fibrous material such as long fiber asbestos. This should not be confused with the very short fiber asbestos which may be used as a dispersing agent. In the illustrative material about 38 pounds per batch are used. According to one method the fiber is preferably first thoroughly dispersed (in water) before addition to the mass. The degree and duration of agitation necessary adequately to disperse the fiber depends upon the character of the fiber. The reinforcing action of the asbestos fiber facilitates handling and prevents complete breaking of the material if it be cracked in applying it to a slightly curved or irregular surface.

The fiber may advantageously be dispersed in the water by means of a beater of paper beater type. The dispersed fiber is then mixed with the previously described batch and prepared for molding. Preferably the mixture is thickened by partial dewatering to minimize segregation of the asbestos. Thickening may be accomplished in standard thickeners or by molding a small fraction of the batch so as to filter out the water in the molded portion then returning the dewatered molded material to the batch and thoroughly mixing it with the batch. Agitation is used during the molding process to counteract any tendency of the fiber to segregate.

Generally, it is desirable for reasons of economy to utilize scraps or trimmings from previously molded materials, and such scrap is introduced to the extent of about eighty pounds for each batch. Preferably the scrap is broken down to a slurry with water and mixing prior to addition to the batch.

After thoroughly mixing the ingredients added to the original batch and thickening as aforesaid, the material is introduced into molds which preferably have a perforated or porous bottom to permit the liquid to filter out. Air or mechanical pressure may be used to hasten expulsion of the liquid. The material is sufficiently "open" or free to permit rapid drainage of liquid by gravity alone, but for added strength, it is desirable to apply very light pressure during dewatering to consolidate, or interlock the material more effectively. The material may be molded in various shapes and thicknesses such as pipe covering and flat slabs. The material may be removed from the mold just as soon as the liquid has drained out. Although still moist the material is sufficiently strong to permit handling and introduction into the drier on palettes or equivalent supporting surfaces.

Prior to molding there is of course some reaction between the lime and the silica and alumina, but such reaction is not complete, and during the subsequent curing and drying operations further reaction or change takes place, because the molded material is efficiently bonded together by calcium silicates and aluminates provided they are protected (as presently described) from harmful reaction with $CO_2$ which commonly occurs in driers operating at the temperatures (e. g. 450° F.) employed in this case. Such driers have heretofore used hot gases of combustion containing substantial amounts of $CO_2$. Indirect heaters have not been used because of the excessive fuel cost necessary to raise the heating medium to the desired temperature. The amount of lime-silica and lime-alumina reaction products which actually function as bonding agents and those which simply are present as light weight refractory aggregates, is not known and obviously cannot be determined by any known means. Therefore, the hydration phase of the process is adjusted so that during curing enough bonding agents will develop to give the finished material a modulus of rupture of at least 50 pounds. Greater strengths are obtained at a sacrifice of insulating efficiency.

The light weight refractory aggregates in the illustrative material have a high insulating efficiency equal to that of so-called 85% magnesia which heretofore has been the most efficient industrial insulation, though not capable of use at high temperatures. This insulating efficiency substantially prolongs the heating and drying period and doubtless also the period of reaction with the lime, and because of this circumstance increases the period during which harmful reactions (e. g. with $CO_2$, if it were present) might take place.

There is some evidence that in the illustrative material $CO_2$ impairs the light weight particles themselves in addition to the bond between them: if the completed and dried material be again moistened and subjected to $CO_2$ there is evidence of weakening. Since both the particles as well as the bonding substances comprise silicates and/or aluminates, it would seem that both might be impaired. A similar weakening does not apparently occur in ordinary Portland cement concrete which comprises silicates and which is exposed for long periods to $CO_2$, but this may be due both to its density which prevents substantial penetration of the $CO_2$ and the relatively small amount of moisture present. My material, when it is first introduced into the heater, contains about 4½ pounds of water for each pound of solids; and its high degree of porosity would provide large surfaces for reaction with $CO_2$. In a 1:2:4 concrete mix there is only about 2 ounces of water to each pound of solids. Past experience with Portland cement concrete may therefore not provide a reliable guide to what occurs in my material.

According to my present theory calcium silicate, and perhaps also calcium aluminate, does not have, at least initially in the present process a definite crystal structure. In its immature form it is unstable and can even be leached out of the material by water, and carbonates readily in the presence of substantial amounts of $CO_2$ and moisture, whether or not it is functioning as a bonding agent or merely as an aggregate. When carbonated it is no longer available as a bonding agent, and as an aggregate it is highly undesirable because it is insufficiently refractory and its greater bulk tends to disrupt the molded mass.

Contrary to what one would expect, I have discovered that substantial exclusion of $CO_2$ and CO during the reaction period reduces shrinkage of the material. One would expect that if $CO_2$ were present shrinkage would be less because of weakening of the bond between the particles and also the increase in bulk due to addition of the carbonate radical. Just the reverse is true. The material shrinks more and is heavier. Thus by developing the bond in the absence of $CO_2$ and CO, the material is not only harder and very much more strongly bonded, but it shrinks less and is lighter.

In the present method I employ as the heating medium, indirectly heated atmospheric air at atmospheric pressure. The $CO_2$ in ordinary air is negligible for present purposes.

Whenever asbestos is present in the illustrative material, drying temperatures should not exceed 600° F., otherwise the asbestos fiber becomes brittle or weaker. Preferably temperatures of about 450° F. are used. Lower temperatures require more time but otherwise are satisfactory.

Similar reactions would occur if magnesia were employed in place of or in addition to lime, but probably not in the same degree because of the slow hydration of magnesia, and material containing magnesia could therefore be advantageously subjected to the above described process.

As stated above the insulating efficiency of the material makes it difficult to transmit heat to the interior of the material to effect the necessary reaction in a minimum time. I have found that this time may be reduced by using a humid atmosphere wherein the heating air at the temperature employed is nearly (that is about 80%) saturated, so that it removes moisture from the surface of the particles (e. g. block or pipe covering) only at the limited rate corresponding roughly to the rate at which water or moisture moves from the interior of the article to the exterior, thereby maintaining a continuous water vehicle by which heat is conducted to the interior of the article to secure the above described reaction. Unless the drying air be thus partly saturated the surface of the articles will dry at too high a rate, thereby creating an efficient insulating layer at the surface which prevents transmission of heat to the interior.

In the illustrative process the degree of saturation of the heating air is controlled by re-circulating a large part of the air and limiting the amount of fresh heated air admitted to the circuit. This can be effected either by controlling the amount of partly saturated air which leaves the circuit (permitting a corresponding amount of dry air to enter) or the amount of fresh air which enters the circuit (thereby displacing a corresponding amount of partly saturated air from the circuit). The amount of relatively dry heated air entering the circuit depends of course on the temperature employed and on what will produce a complete reaction on the interior of the material in a minimum time. At the temperature above given the above described reaction requires about 30 to 35 hours for block material about 4" in thickness and about 20 hours for pipe covering.

In the drawing is illustrated one method of treating the material. As there shown the material is caused to pass through an elongated chamber 10, in this case on wheeled trucks. As the trucks successively enter the door 12, a truck may be discharged through the door 11. At all other times the doors remain closed. The particular means for conveying the material through the chamber is of course a matter of choice. One or more such trains or lines of material may be used. The material should be placed or stacked on the conveying means in such a way as to secure the most efficient exposure of the material to the heating air consistent with an efficient use of the apparatus.

The heating atmosphere is preferably air which contains a negligible amount, if any, of $CO_2$ and CO. It is heated by a so-called indirect heater 13, one form of which is here illustrated. The details of this specific indirect heater form no part of the present invention. It is more fully disclosed in Patent No. 1,546,592. The heating element or elements comprise a circuitous fire tube 14 which extends continuously back and forth across the heating chamber 15 until it reaches the stack 16 by which products of combustion escape. The heating medium may be gas or oil. It should be understood that the fire tube 14 prevents admixture of products of combustion with the air being heated. The air is heated by a counterflow principle for which purpose the fire tubes are surrounded by a heating jacket 17 outside of which is a space 18 through which air travels to the top of the jacket, entering the space inside the jacket at 19 and traveling downwardly from the coolest to the hottest fire tubes and issuing therefrom at the bottom at the point 20. Preferably the fire tubes 14 are provided with radiating fins between which the air passes so as to effect a more efficient heat exchange. In the present case the heated air is withdrawn from the chamber by circulating fan 21 and forced through conduit 22 to the chamber 10. The heated air may be introduced into and removed from the heating chamber 10 at one or more points depending on the length and height of the chamber and what is necessary to secure uniform and adequate contact of the heated air with the material. For purposes of illustration the air enters the chamber by the duct 22 at one end and is withdrawn through the duct 23 adjacent the other end. At one or more places damper controlled stacks 24 permit controlled escape of partly saturated air from the circuit, thereby permitting a corresponding amount of fresh air to enter the circuit, in this case, through the damper controlled inlet 25. The stack dampers at the inlet 25 need not be employed if stack dampers 26 be employed, since no more air can enter the circuit than leaves it by the stack 24.

It will be understood that the invention is not limited to the details of the heating and drying apparatus. The aforesaid method makes it possible to develop the above described improved bond simultaneously with drying of the material and to secure the other advantages above referred to.

In passing through the heater the air is, of course, heated substantially above the boiling point of water and the moisture in the air becomes steam. However, traveling as it does, counter to the flow of material, the heated air strikes the hottest material first and its temperature is gradually reduced by contact with the material so that by the time it reaches the moist material, the water in the air then functions to retard the rate of drying as above explained. In other words, even though the air is heated substantially above 212° F., its action on the material is not the same as though it were dry or substantially dry air at the same temperature.

On the other hand, it is equally important that the heating medium be not merely steam, as in an indurator or auto-clave. I have found that heating the material first with steam as in an auto-clave and then subsequently drying causes serious cracking of the material. It is important that the heating and drying be carried on in a single operation or simultaneously.

The problem presented in forming or improving the bond in a highly efficient thermal insulation is vastly different from that in bonding heavier material. Indeed the latter material presents no similar or equivalent problem, and teaches nothing respecting a solution of the problems presented by my materials. The present material although capable of withstanding temperature up to 1400° F. weighs only 12 to 14 lbs. per cubic foot. Yet it has a K-factor (the index of insulating efficiency) of only .34 or less at a mean temperature of 200° F. and a modulus of rupture (the index of strength) of 50 lbs. or more, as compared to 85% magnesia (a well-known standard industrial insulation) which under the same conditions and weight has a K-factor of .4 and a modulus of rupture of 18 to 45 lbs. At a mean temperature of 350° F. (a mean temperature which 85% magnesia cannot even stand) my material has a K-factor of .4. The identical material cured and dried identically as in the present method except in an atmosphere containing substantial amounts of $CO_2$ (as with gases of combustion) has a modulus of rupture of only about 33 lbs., as compared with 52 lbs. for the present material. The forming of an efficient bond which does not reduce insulating efficiency below acceptable limits and yet provides adequate strength with light weight, is of the utmost importance in a material of this character. In heavier materials where there is a great surplus of strength, the foregoing method of improving the bond is wholly irrelevant.

This application is a continuation in part of my co-pending application Serial 578,300, now abandoned.

Obviously the invention is not limited to the details of the illustrative product or its process of manufacture since these may be variously modified. Moreover, it is not indispensable that all features of the invention be used conjointly since various features may be used to advantage in different combinations and sub-combinations.

Having described my invention, I claim:

1. The method of making high temperature mineral insulating material which comprises molding a wet mixture of bentonite as a dispersing agent and minute particles of Portland cement substantially completely hydrated when dispersed by said bentonite, the particles of Portland cement having a low bulk density and adapted to form when bonded together a refractory insulating material weighing not more than twelve to fourteen pounds per cubic foot, said Portland cement normally including about 13 to 20% of lime and said bentonite normally including about 20% alumina and 60% silica, said alumina and silica being adapted to combine with said lime to form calcium aluminates and silicates respectively to bond said hydrated particles of cement together, said mixture also including additional silica so that with the silica and alumina from the bentonite sufficient silica will be present to combine with substantially all said lime, and then while the molded material is wet and before completion of reaction between the bond forming substances surrounding the material with a heating atmosphere of hot air about 212° F. but not exceeding 600° F. having no more carbon dioxide than is present in ordinary atmospheric air, continuing heating in said atmospheric air until reaction of said bonding substances is substantially completed, said reaction in an atmosphere substantially free from carbon dioxide developing a bond to bond the particles of Portland cement together to provide a bonded material having a modulus of rupture of about fifty pounds.

2. The method of making high temperature mineral insulating material which comprises molding a wet mixture of minute unbonded particles of refractory mineral aggregates having a low bulk density and comprising substantially completely hydrated particles of Portland cement adapted when bonded together to provide an insulating material weighing not more than twelve to fourteen pounds per cubic foot, said mixture also including bentonite and a substantial amount of lime normally liberated by the Portland cement during hydration, said bentonite comprising alumina and silica each adapted to combine with said lime to form calcium silicates and aluminates, and additional silica selected from the group consisting of diatomaceous earth and fly ash in such amount as with the bentonitic silica and alumina to combine with substantially all said lime, and then while the molded material is wet and before completion of reaction between the bond forming substances surrounding the material with a heating atmosphere of hot air above 212° F. but not exceeding 600° F. having no more carbon dioxide than is present in ordinary atmospheric air, continuing heating in said atmosphere until reaction between said alumina, silica and lime is substantially complete thereby giving to said material weighing not more than twelve to fourteen pounds per cubic foot a modulus of rupture of about fifty pounds.

3. In the manufacture of molded high temperature insulation having a modulus of rupture of at least fifty pounds and weighing not in excess of fourteen pounds per cubic foot and comprising sub-microscopic particles of Portland cement substantially completely hydrated in separated condition, lime liberated by and during hydration of the Portland cement and being in amount equivalent to 13 to 20% of the dry weight of the Portland cement, and silica adapted to react with said lime to bond said particles together, the method which comprises molding the foregoing materials in wet condition and before completion of reaction between the bond forming substances surrounding the material with a heating atmosphere of hot air above 212°

F. but not exceeding 600° F. having no more carbon dioxide than is present in ordinary atmospheric air, continuing heating in said atmosphere until reaction of said bonding substances is substantially complete, the resulting dry product weighing not more than twelve to fourteen pounds per cubic foot and having a modulus of rupture of about fifty pounds.

4. The method of producing mineral insulating materials which comprises molding an aqueous mixture of light weight refractory mineral aggregates comprising as the major ingredient minute unbonded particles of Portland cement substantially completely hydrated in separated condition, lime liberated by hydration of the Portland cement in an amount equivalent to 13 to 20% on the dry weight of the Portland cement, and silica adapted to react with said lime in the presence of heat and moisture to bond said refractory aggregates together, then while the molded material is wet and before completion of reaction between the lime and silica continuously surrounding the material with a heating atmosphere of hot air at atmospheric pressure heated above 212° F. but below 600° F. having no more carbon dioxide than is in ordinary air, and continuing heating in said atmosphere until reaction of said bonding substances is substantially complete, the resulting product weighing not more than twelve to fourteen pounds per cubic foot and with a modulus of rupture of fifty pounds.

5. The method of producing mineral insulating materials which comprises molding an aqueous mixture of light weight refractory mineral aggregates comprising a major amount of minute unbonded Portland cement particles hydrated in dispersed condition, bentonite for dispersing said Portland cement during hydration and in an amount equivalent to about one-fifth of the Portland cement, lime normally present in hydrated Portland cement, said bentonite comprising silica and alumina adapted to react in the presence of heat and moisture with said lime to form calcium silicates and aluminates to bond said aggregates together, and additional silica sufficient with said bentonitic silica and alumina to react with all the lime, then while the molded material is wet and before completion of reaction between the lime and silica heating the molded material at substantially atmospheric pressure, and during said reaction continuously surrounding said material with an atmosphere of hot air having no more carbon dioxide than is in ordinary atmospheric air, said hot air being heated above 212° F. but not exceeding 600° F.

6. The method of producing mineral insulating materials which comprises molding an aqueous mixture of light weight refractory mineral aggregates comprising minute particles of unbonded Portland cement substantially completely hydrated in separated condition, said mixture including the lime normally liberated by the Portland cement and additional silica adapted to react with the lime in the presence of heat and moisture to form calcium silicates to bond said aggregates, said calcium silicates being impaired by carbon dioxide in the presence of moisture, and then while the molded material is wet and before completion of reaction between the lime and silica continuously surrounding said material with an atmosphere of hot air at atmospheric pressure having no more carbon dioxide than is in atmospheric air, said air being heated in excess of 212° F. but not exceeding 600° F.

HENRY NAPIER.

REFERENCES CITED

The following references are of record in the file of this patent:

UNITED STATES PATENTS

| Number | Name | Date |
| --- | --- | --- |
| 152,167 | Ransome | June 16, 1874 |
| 1,520,893 | Teitsworth | Dec. 30, 1924 |
| 1,932,971 | Huttemann et al. | Oct. 31, 1933 |
| 1,964,088 | Snell | June 26, 1934 |
| 2,044,204 | Brice et al. | June 16, 1936 |
| 2,209,753 | Abrahams et al. | July 30, 1940 |